(12) United States Patent
Khadavi

(10) Patent No.: US 7,027,405 B1
(45) Date of Patent: Apr. 11, 2006

(54) SYSTEM AND METHOD FOR BROADBAND ANALYSIS OF TELEPHONE LOCAL LOOP

(75) Inventor: Kamran R. Khadavi, Encino, CA (US)

(73) Assignee: Fluke Corporation, Everett, WA (US)

( * ) Notice: Subject to any disclaimer, the term of this patent is extended or adjusted under 35 U.S.C. 154(b) by 875 days.

(21) Appl. No.: 09/684,536

(22) Filed: Oct. 6, 2000

(51) Int. Cl.
G01R 31/08 (2006.01)

(52) U.S. Cl. ............ 370/244; 370/252; 379/1.04

(58) Field of Classification Search ............ 370/242, 370/252, 465, 480, 478, 243–244; 379/1.01, 379/1.03, 1.04
See application file for complete search history.

(56) References Cited

U.S. PATENT DOCUMENTS

| 5,166,925 | A | 11/1992 | Ward ............ 370/55 |
| 5,623,543 | A * | 4/1997 | Cook ............ 379/402 |
| 5,892,765 | A | 4/1999 | Shapard et al. ............ 370/401 |
| 6,091,713 | A | 7/2000 | Lechleider et al. ............ 370/248 |
| 6,192,109 | B1 * | 2/2001 | Amrany et al. ............ 379/30 |
| 6,266,395 | B1 * | 7/2001 | Liu et al. ............ 379/27.01 |
| 6,426,961 | B1 * | 7/2002 | Nimmagadda ............ 370/493 |
| 6,477,238 | B1 * | 11/2002 | Schneider et al. ............ 379/22.04 |
| 6,628,754 | B1 * | 9/2003 | Murphy et al. ............ 379/1.03 |
| 6,631,120 | B1 * | 10/2003 | Milbrandt ............ 370/252 |
| 6,643,266 | B1 * | 11/2003 | Pugaczewski ............ 370/249 |

OTHER PUBLICATIONS

GR-303-CORE, Integrated Digital Loop Carrier System Generic Requirments, Objects, and Interface; Dec. 2000, Telcordia Technologies, Issue 4, sections 1-3.*

* cited by examiner

Primary Examiner—Chau Nguyen
Assistant Examiner—Ian N. Moore
(74) Attorney, Agent, or Firm—Allen, Dyer, Doppelt, Milbrath & Gilchrist, P.A.

(57) ABSTRACT

A method and system analyzes a telephone local loop and includes a central office operatively connected to the telephone local loop. A bandwidth analysis system is operatively connected to the central office and operative for determining the physical loop faults within the loop; qualifying the local loop for a particular Digital Subscriber Line (DSL) technology; and quantifying the local loop by calculating the transmit signal Power Spectral Densities (PSD) and calculating upstream and downstream data rates for particular DSL technology.

37 Claims, 3 Drawing Sheets

SYSTEM AND METHOD FOR BROADBAND ANALYSIS OF TELEPHONE LOCAL LOOP

FIELD OF THE INVENTION

The present invention is related to communication systems and methods for analyzing same, and more particularly, this invention relates to qualifying and quantifying a telephone local loop for wideband services and recommending the best technology in wideband services for the local loop under test.

BACKGROUND OF THE INVENTION

Broadband services supplied to a customer over the copper local loop are becoming increasingly more popular with the rise of the Internet and other technologies requiring wideband local loop applications. It is well known that Digital Subscriber Line (DSL) technology improves the bandwidth of existing analog phone systems. Data throughput of up to 52 Mbits/sec can be provided over small distances, which increase as the data rate is lowered.

The customer local loop refers to the existing twisted-pair wire that extends between a local telephone company switching office and most homes and offices. As is well known, the bandwidth was typically limited to 3,000 Hz, because of the relegation of the local twisted-pair wire to the voice telephone system and its audio frequencies. In the past, most telephone switching equipment was designed to cut off signals from about 4,000 Hz and filter noise off the voice line.

More phone companies are upgrading their switching equipment to obtain a greater bandwidth since the advent of the Internet. The different technologies of DSL, also referred to as xDSL, range in speed from 16K bits/sec to 52 Mbits/sec, and can be either symmetrical, where traffic flows at the same speed in both directions or asymmetrical, where the downstream capacity is higher than the upstream capacity. Asymmetrical DSL services can typically be used by Internet users at home, for example, allowing a user to download more graphic files and upload only commands.

As the data rate increases, the carrying distance for xDSL service decreases. Also, xDSL connections are point-to-point and are always connected with no dial up, and no switching. There is always a direct connection into a carrier's frame relay, ATM (Asynchronous Transfer Mode), or an Internet-connect system.

The different types of xDSL service include High-bit-rate Digital Subscriber Line (HDSL), which provides T1 data rates of 1.544 Mbits/sec over about 12,000 feet of line length. Two lines are used and voice services are not operable. It is usually provided for feeder lines, interexchange connections, Internet servers, and private data networks.

Symmetrical Digital Subscriber Line (SDSL) is a symmetrical, bidirectional DSL service using one twisted-pair wire and operates above the voice frequency. This allows voice and data to be carried on the same wire.

Asymmetrical Digital Subscriber Line (ADSL) allows a much greater downstream data rate. It is operable best for Internet services and the rate varies, depending on the downstream rate and downstream distance. For example, when using a downstream rate of 1.544 Mbits/sec, the downstream maximum line distance is about 18,000 feet. If the downstream rate is increased to 8.448 Mbits/sec, the downstream maximum line distance is only about 9,000 feet.

Very high-bit-rate Digital Subscriber Line (VDSL) is a very high asymmetrical data rate. It allows an upstream rate of about 12.96 Mbits/sec with a maximum line distance of about 4,500 feet, and an upstream rate of about 51.84 Mbits/sec, with an upstream maximum line distance of about 1,000 feet.

Rate-Adaptive Digital Subscriber Line (RADSL) is similar to ADSL, but includes a rate-adapted feature to adjust transmission speed to match the quality of the line and length of the line. It is possible to use a line-pulling technique to establish a connection speed when the line is first established.

ISDN DSL (IDSL) operates at about 128 Kbps, which is less than most other DSL technologies. It is a dedicated service as compared to standard ISDN services. IDSL is data-only and lacks any analog voice line.

Although xDSL technologies are becoming increasingly important, there is still an inability to adequately prequalify the local copper loops accurately. This has been a significant obstacle for the Local Exchange Carriers (LECS). Prequalification has now become critical because the different xDSL technology services is dependent on the design and quality of the outside plant (OSP) and the presence of load coils, which block DSL transmission. Prequalification also determines if the local loop is capable of supporting DSL transmission prior to any attempt to provide service. There will be significant cost savings for the LEC if the loop could be qualified without having to dispatch technicians to either a central office (CO) or to the customer premises. As noted above, there are a number of DSL services and even more are projected by the industry. Thus, there is a strong need for an even more improved automated testing capability to handle the growing line volume of xDSL technologies. It is necessary, then, to predict a local loop's capability to support xDSL services across an entire range of frequencies over which this technology can operate.

There are some systems for estimating the ability of a subscriber loop to support broadband services, such as disclosed in U.S. Pat. No. 6,091,713 to Lechleter et al. Also, there are various Wideband Test Packs (WTP) and Remote Test Units (RTU), such as manufactured by Harris Corporation of Melbourne, Fla., that are used for diagnosing service-affecting problems for all xDSL and ISDN services. These units can act as an intelligent test head, as known to those skilled in the art. Greater efficiency in testing, qualifying, and quantifying the local loop is desired, however.

SUMMARY OF THE INVENTION

It is therefore an object of the present invention to provide an improved method and system of analyzing a telephone local loop for broadband services.

In accordance with the present invention, the method and system analyzes a telephone local loop by first determining the physical loop faults within the local loop. The local loop is qualified for a particular Digital Subscriber Line (DSL) technology. The local loop is then quantified by calculating the signal-to-noise ratio and calculating the data rates of the local loop for a particular DSL technology. In one aspect of the present invention, the DSL technology comprises symmetric DSL technology, and in another aspect of the present invention, it comprises asymmetric DSL technology.

In yet another aspect of the present invention, the local loop is quantified by modeling the local loop, including the resistance, inductance, capacitance and conductance (RLCG) primary constants and the line parameters for various segments of the local loop. The line parameters can be modeled based on the frequency and RLCG primary constants.

Physical loop faults can be determined by obtaining plant data and test results from a test head within a communications network containing the local loop. The local loop can be qualified by testing for the presence or absence of load coils, impulse noise counts and ringer counts, and then comparing the counts with thresholds specified by given DSL technologies. The local loop can be quantified by calculating downstream and upstream data rates based on the downstream and upstream transmit signal power spectral densities, insertion loss, and noise versus frequency measurements. The insertion loss of the local loop can be calculated with or without bridge tabs based on the cable type, wire gauge, loop length and its topology. The local loop can also be quantified by selecting a particular DSL technology from a configurable list of DSL technologies and analyzing each technology within the list until the local loop qualifies.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
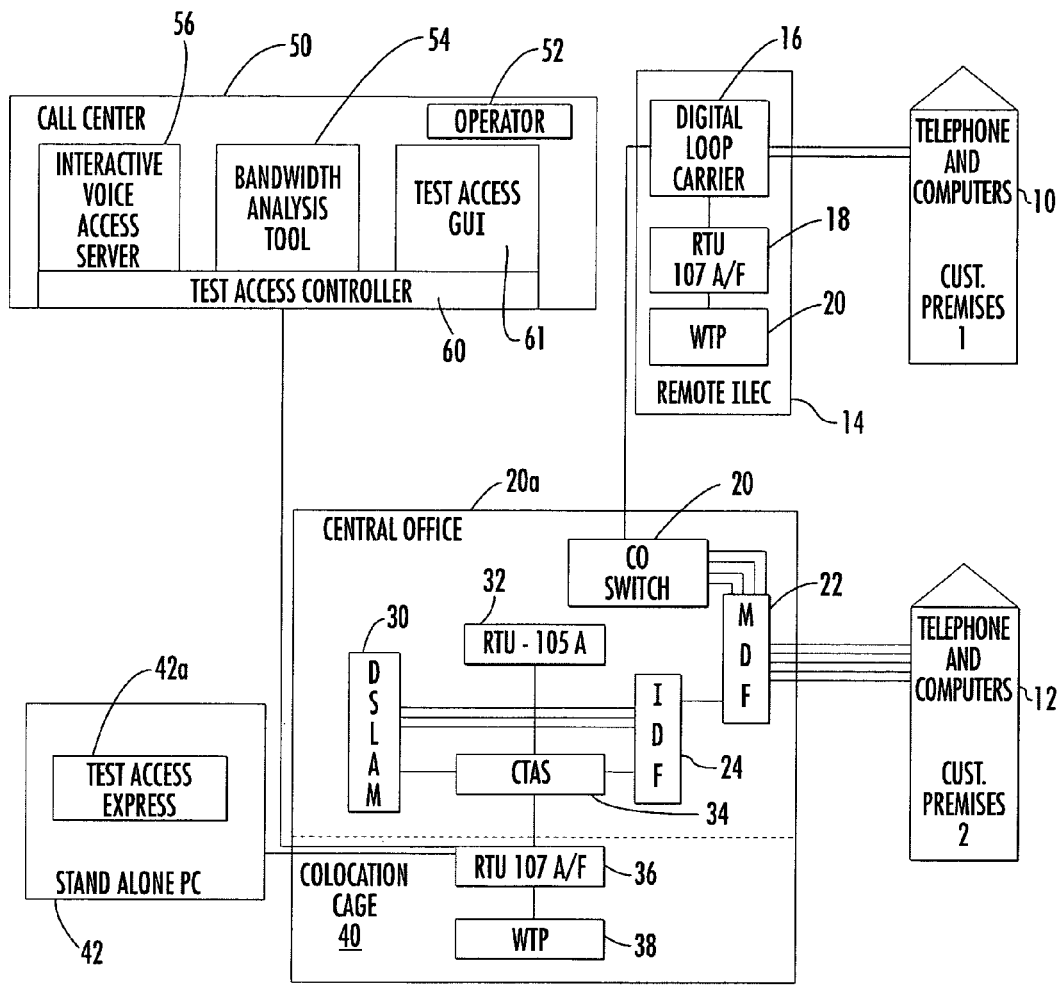
FIG. 1 is a block diagram of a network element interconnection that uses a Remote Testing Unit and Wideband Test Pack for testing the local loop, in accordance with one aspect of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous and provides a system and method for analyzing the customer local copper loop using a software module, also called the Bandwidth Analysis Tool (BAT) throughout this description. This software module analyzes the raw data results from a Wideband Test Pack (WTP), such as manufactured by Harris Corporation of Melbourne, Fla., and also the plant record data, to qualify and quantify the local copper loop under test for a particular xDSL technology. Alternatively, the Bandwidth Analysis Tool can also analyze the WTP data and plant record data to recommend the best technology for a given application.

This analysis uses loop qualification and quantification based on WTP raw data results, plant record data, loop topology and the loop insertion loss. The loop is modeled to calculate the insertion loss, with or without bridged taps, taking into account the cable type, the wire gauge, loop length, and its topology. A signal-to-noise ratio of the receive signal is calculated using the specific technology, as dependent on the transmit signal power spectral density templates and noise versus frequency data results from the Wideband Test Pack. The downstream and upstream data rates are calculated for the local loop under test.

The algorithm for loop qualification and quantification can have two principle functions: (1) determining physical loop faults; and (2) analyzing for xDSL technology.

The determination of physical loops is performed by testing for shorts, opens, load coils, and similar factors. The xDSL technology testing analyzes for symmetric DSL or asymmetric DSL, as appropriate. Loop qualification is accomplished by testing for the presence or absence of load coils, impulse noise counts, ringer counts, and then comparing the counts with the thresholds specified by the given technologies. Loop quantification is accomplished for xDSL technologies by modeling the local loop under test, calculating the signal-to-noise ratio, and calculating the data rates. In the case of symmetric DSL technologies, downstream and upstream data rates are equal, as known to those skilled in the art. In the case of asymmetric DSL technologies, downstream and upstream data rates are calculated based on downstream and upstream transmit signal power spectral densities (PSD), insertion loss, and noise versus frequency measurements.

Loop quantification for VDSL is performed as a special case because of the restrictions of the bandwidth of the Wideband Test Pack. In the case of VDSL, loop quantification is accomplished based on loop topology, rather than using signal-to-noise ratios. In a "recommend best technology" mode of the system, the technology is set to a DSL technology from a configurable list of technologies, and the analysis is performed for each technology in the list until the loop qualifies. Otherwise, the system continues analysis of the loop for the next technology on the list. If the list is exhausted, the program returns a "failed" status. If the loop qualifies for a DSL technology, the status is set to a "pass", and the recommended technology is set to the current technology for which the loop has been analyzed, and any calculated data rates are returned.

Referring now to FIG. 1, there is illustrated a typical Remote Test Unit to network element interconnection that uses a Wideband Test Pack and Bandwidth Analysis Tool software module of the present invention. Naturally, the Bandwidth Analysis Tool used as a software module can be adapted for use with different network elements and components, as suggested by those skilled in the art. The example as illustrated shows only one out of many different configurations.

The block diagram of FIG. 1 illustrates two home premises 10,12 having telephones and computers at the customer premise. These are connected to a remote Incumbent Local Exchange Carrier (ILEC) 14 having a Digital Loop Carrier 16 and a Remote Test Unit 18, such as a model 107A/F Remote Test Unit as manufactured by Harris Corporation of Melbourne, Fla., and a Wideband Test Pack, such as are manufactured by Harris Corporation. A Central Office switch 20 as part of the Central office (CO) 20a is connected to the Digital Loop Carrier 16 and to the other customer premises 12 via a Main Distribution Frame (MDF) 22. An Intermediate Distribution Frame 24 connects to the MDF 22. A DSL Access Multiplexer (DSLAM) 30 is connected to the Intermediate Distribution Frame 24, with operative connection to a Remote Test Unit 32, such as a Harris model 105A, a Carrier Test Access Switch (CTAS) 34, such as manufactured by Harris Corporation, a Remote Test Unit 36, such as a Harris model 107A/F, and a Wideband Test Pack 38, located in a Colocation Cage 40. The Remote Test Unit is connected to a stand alone PC 42 that could include a Test Access Express circuit 42a, similar in function to a Test Access Controller as manufactured by Harris Corporation. A Call Center 50 includes, as is normal in this example, an operator 52, the Bandwidth Analysis Tool 54 of the present invention shown in block diagram and representing a software module, and an Interactive Voice Access Server 56.

A central component of the system is a Test Access Controller (TAC) 60, which is a sophisticated software-based element of a test operational support system. It provides communication and a control interface with remote test heads and interfaces with legacy systems and databases. It can be accessed through a graphical user interface 61 that is windows-based to facilitate communications with call center personnel and other test operators.

As noted before, the test heads can include the Remote Test Unit, such as the model 105A, designed for use in the Central Office, and the model 107A/F, such as for a DLC environment and CLEC Colocation Cages. These Remote Test Units access lines by various ways, including a Carrier Test Access Switch to provide capacity of 128 lines, or a daisy-chaining circuit with up to seven other carrier test access switches to provide test access to over 1,000 lines. The Remote Test Unit can have direct access through the DSLAM or DLC, if there is metallic test access capability.

The Wideband Test Pack performs high frequency testing via the Remote Test Units, measuring high-frequency loss, noise margin, bridged tabs, impulse noise and longitudinal balance. The Wideband Test Packet can provide data used by the Bandwidth Analysis Tool to determine what xDSL services a provider can offer a customer, in accordance with the present invention. The Wideband Test Pack can also generate tones for noise analysis. The Interactive Voice Access (IVA) technology shown at the Call Center can allow field technicians at either an ILEC or CLEC to gain access to testing functions and database records.

A Wideband Test Pack, such as manufactured by Harris Corporation, allows accurate, single-ended testing. The Wideband Test Pack can detect bridge taps, measure wideband circuit balance, measure high-frequency background noise, and provide a frequency spectrum line profile for identifying noise impairment. Also, double-ended tests can be performed to isolate problems.

Some of the operating ranges of a Wideband Test Pack that could be used in the present invention are listed below. Although these are only examples, these figures give a general idea of the type of specifications that a Wideband Test Pack or other device could have to obtain the raw data used by the Bandwidth Analysis Tool of the present invention.

Wideband Noise—Measures the total Gaussian noise up to 1500 KHz:

| | |
|---|---|
| Frequency Range | 4 KHz to 1500 KHz |
| Noise Level Range | 0 dBrN to +120 dBrN |
| Accuracy | +/−5% |
| Resolution | 1 dB |
| Display Precision | 1 dB |

Power Spectral Density/Noise Margin—Provides detailed analysis of noise energy in DSL frequency bands:

| | |
|---|---|
| Frequency Range | 4 KHz to 1500 KHz |
| Frequency Band Sampling Range | 4 KHz minimum |
| Power Spectral Density Range | 0 dBrN to +120 dBrN |
| Accuracy | +/−5% |
| Resolution | 1 dB |
| Display Precision | 1 dB |

Tone Generation & Measurement—Applies and measures high frequency tones:

| | |
|---|---|
| Frequency Range | 4 KHz to 1500 KHz |
| Signal Level Range | −30 dBm to +30 dBm |
| Accuracy | +/−5% |
| Resolution | 1 dB |
| Display Precision | 1 dB |

Impulse Noise—Measures impulse noise at any frequency over DSL frequency range:

| | |
|---|---|
| Event Threshold Range | −70 dBm to +30 dBm |
| Effective Frequency Range | 4 KHz to 1500 KHz |
| Length of Test | 10 to 3600 seconds |

Longitudinal Balance (Metallice to Longitudinal and Vice Versa)—Longitudinal balance measurements verify the susceptibility of a copper pair to crosstalk and other noise sources:

| | |
|---|---|
| Frequency Range | 4 KHz to 1500 KHz |
| Frequency Band Sampling Width | 4 KHz minimum |
| Circuit Balance Range | 0 dB to +60 dB |
| Accuracy | +/−5% |
| Resolution | 1 dB |
| Display Precision | 1 dB |

Bridge Tap Detection—Bridge taps may severely limit the reach and speed of DSL signals due to reflections:
Range up to 12,000 feet
Control and Management—Works with remote test unit.

Figure 2:
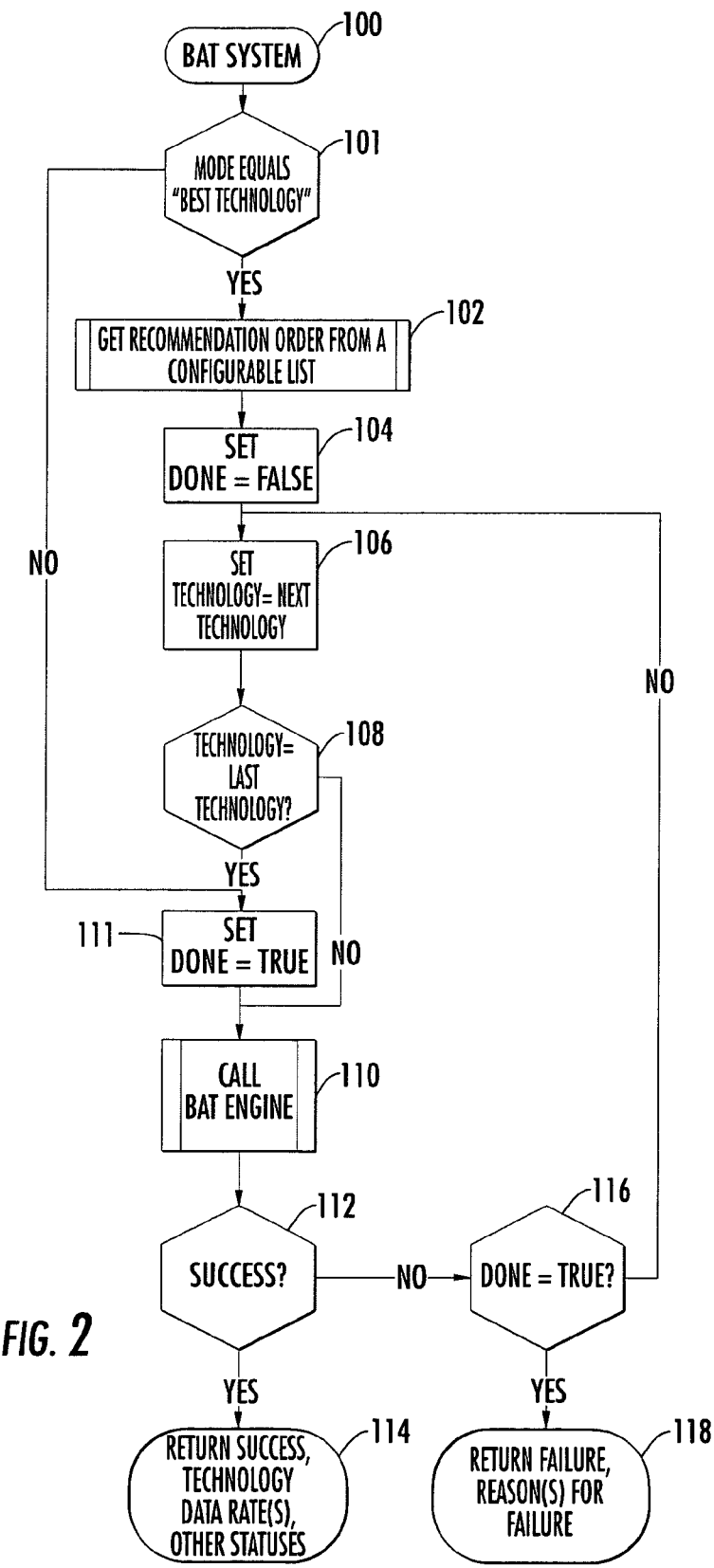
FIG. 2 is a high level flow chart illustrating one basic method used in the present invention for analyzing the local loop for wideband services.
Figure 3:
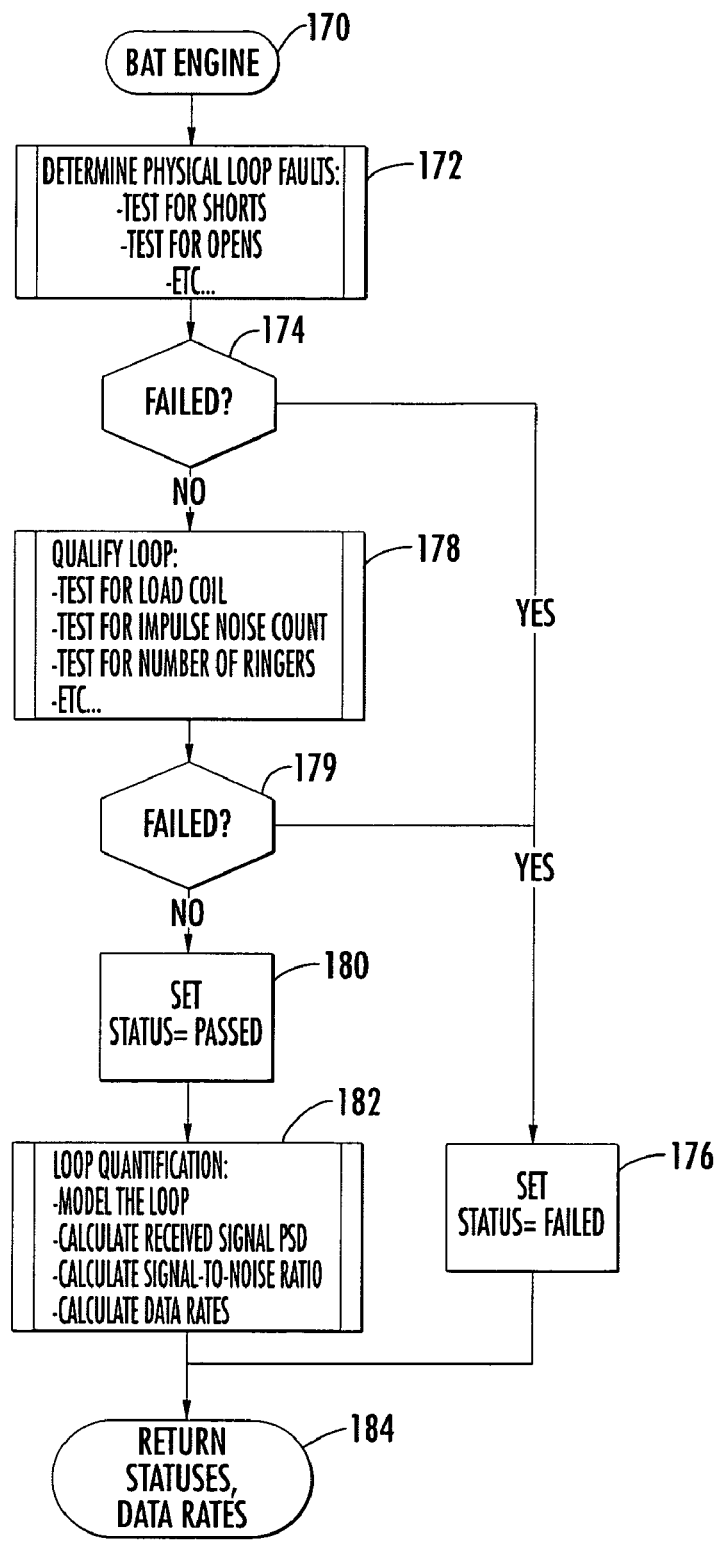
FIG. 3 is a more detailed flow chart of an example of the algorithm used for testing the local loop, in accordance with the present invention.

Referring now to FIGS. 2 and 3, there are illustrated two flow charts showing the high level operation of the Bandwidth Analysis Tool (BAT) of the present invention and the operation of the BAT engine, as shown in FIG. 3. For purposes of illustration, the flow charts begin with reference numbers in the 100 series.

As shown in FIG. 2, the BAT system begins operation (Block 100) and a determination is made whether the mode equals the "best technology" (Block 101). There are two modes of operation: the first mode is the qualification of a line for a specific technology; the second mode recommends the best technology based on the application. In this flow chart, a determination is made of what mode the user desires to run, and if the mode equals the best technology, then a recommendation is received from a configurable list. The system software of the BAT queries a look-up table to obtain the first technology recommended for the application, and then qualifies the loop for that technology. As shown in Block 102, a recommendation order is obtained from a configurable list. The system sets a False status for "Done" (Block 104). The technology is set for the next technology (Block 106). If the last technology is not equal to the technology (Block 108), then the BAT engine is called (Block 110). If the technology does equal the last technology, then "Done" is set to true (Block 111) and then the BAT engine run. If there is success in running the BAT engine (Block 112), then the technology, data rate and other status are returned (Block 114). If there is no success, and "Done" equals true (Block 116), then a failure is returned (Block 118). The system BAT software goes through the technology list until the loop qualifies for a technology, and then returns to the path and data rates. If it fails, then the loop did not qualify for any technologies for the application.

FIG. 3 illustrates the operation of the BAT engine by means of the high level flow chart as illustrated. The BAT engine is run (Block 170), and physical loop faults are determined (Block 172), such as by testing for shorts and testing for opens, and other similar tests. If there has been a failure (Block 174), then the status is set to failed (Block 176). If there has not been a failure, then the loop is qualified by testing for a load coil, impulse noise count, number of ringers, and other similar tests (Block 178). If there has been a failure based on the loop qualification (Block 179), then the status is set to failed (Block 176). If not, then the status is set to PASSED (Block 180) and Loop Quantification occurs (Block 182). At this point, the loop is modeled and the received signal PSD is calculated, as well as the signal-to-noise ratio. Data rates are calculated. Statuses and data rates are then returned (Block 184).

For purposes of description, the pseudo-code for the bandwidth analysis tool software module is explained below. These various pseudo-code segments are taken in order and described, starting with the highest level and following to more detailed aspects of the Bandwidth Analysis Tool. Various inputs and outputs are described, as well as functions that are accomplished.

```
1.  Pseudo-code BAT Engine
Inputs:
    Test Results from WTP, RTU and Plant data
    Threshold Data (technology and sub_tech dependent),
from a setup table
    Downstream and Upstream transmit Signal Data
(technology dependent),
    Technology ID
Outputs:
    Pass/Fail status
    Reason for failure and/or status information
    Downstream data rate
    Upstream data rate
Determine Physical Loop Faults
Analyze loop for xDSL
end of BAT Engine pseudo-code
```

As illustrated with the pseudo-code of the BAT engine, the various inputs include test results from the Wideband Test Pack, the Remote Test Unit and plant data. There are various thresholds that are technology dependent, such as the ringers and number of impulses that the technology will tolerate. These factors are all technology dependent and different thresholds are established for that specific technology, as known to those skilled in the art. This threshold data can be obtained from a set up table for the technology. Additionally, downstream and upstream transmit signal data are technology dependent. Examples include the level of the signal at the transmitter end, and the Power Spectral Density (PSD) of the signal that is allowed for specific technologies.

For example, for various types of xDSL technology, the Power Spectral Density cannot exceed certain masks (or templates) for each technology used at the transmit signal level. The technology ID confirms the technology identification.

The outputs can include a pass/fail status, reasons, and status information to show a lack of needed input data to form a concrete analysis. There could be some confidence level that is gained concerning the analysis and the reasons why the test may have failed or passed, such as if there were detected ringers, bridge taps and other similar items. The downstream/upstream data rate also is obtained.

At the next level, the loop is analyzed for xDSL, corresponding to the various DSL technologies. This occurs after the determination of physical loop faults.

```
2.  Pseudo-code to Determine Physical Loop Faults
Inputs:
    Test Results from WTP, RTU and Plant data
    Technology dependent Threshold Data (technology dependent)
    Technology ID
Outputs:
    Pass/Fail status
    Reason of failure
If Load Coil Information is Available
If Load Coil Present
    Set PassFail = FAIL;
    Set status Load Coil Present;
else
    Set PassFail = PASS;
else
    Set Reason for failure, Load Coil Information Not Available
```

Physical loop faults are determined with similar inputs as before, such as the test results from the WTP, RTU and plant data. It is technology dependent with threshold data, and a technology ID. The outputs include a pass/fail status and the reason for the failure. Load coil information is necessary to determine the physical loop faults because the load coils have an adverse effect on the DSL technology. Based on the xDSL technology, a different analysis is accomplished. The system also checks to determine what technology the system is qualifying the loop, such as symmetric DSL or asymmetic DSL.

```
3.  Pseudo-code to Analyze XDSL
Inputs:
    Test Results from WTP, RTU and Plant data,
    Threshold Data (technology dependent),
    Downstream and Upstream transmit Signal Data
(technology dependent),
    Technology ID
Outputs:
    Pass/Fail status
    Reason of failure
    Downstream data rate
    Upstream data rate
    switch (Technology ID)
        // symmetric technologies
        case BAT_HDSL:
        case BAT_HDSL_1160:
        case BAT_HDSL_584:
        case BAT_HDSL_392:
        case BAT_SDSL:
        case BAT_SDSL_144:
        case BAT_SDSL_400:
        case BAT_SDSL_784:
        case BAT_SDSL_1040:
        case BAT_IDSL:
            Analyze Symmetric DSL;
        break;
```

```
            // Asymmetric technologies
            case BAT_ADSL:
            case BAT_RADSL:
            case BAT_HDSL2:
            Analyze Asymmetric DSL;
            // VDSL is processed separately
            case BAT_VDSL:
            AnalyzeVDSL;
            break;
            default:
                set PassFail = FAIL
            set Reason for failure, technology not supported
        // end switch (Technology ID)
        // end Analyze XDSL
```

When analyzing the xDSL, it is evident that an analysis occurs based on the technology with a different analysis depending on what technology is being analyzed, such as HDSL, SDSL, ADSL, RADSL, HDSL2 and other possible xDSL technologies.

```
4.  Pseudo-code to Analyze Symmetric DSL
Inputs:
    Test Results from WTP, RTU and Plant data
    Threshold Data (technology dependent)
    Downstream and upstream transmit Signal Data
    (technology dependent)
    Technology ID
Outputs:
    Pass/Fail status
    Reason of failure
    Downstream data rate
    Upstream data rate
    Qualify Loop
    if Loop Qualified
        switch (Technology ID)
            case BAT_HDSL:
            case BAT_HDSL_1160:
            case BAT_HDSL_584:
            case BAT_HDSL_392:
                Quantify HDSL
                break;
            case SDSL:
                case SDSL_144:
                case SDSL_400:
                case SDSL_784:
                case SDSL_1040:
                case SDSL_1568:
                    QuantifySDSL
                break;
                case BAT_IDSL:
                    Quantify IDSL
                break;
        // end switch (Technology ID)
// end Analyze Symmetric DSL
```

When analyzing symmetric DSL, the loop is first qualified and then the BAT system quantifies HDSL, followed by quantifying SDSL, and then IDSL.

```
5.  Pseudo-code to Analyze Asymmetric DSL
Inputs:
    Test Results from WTP, RTU and Plant data,
    Threshold Data (technology dependent),
    Signal Data (technology dependent),
    Technology ID
Outputs:
    Pass/Fail status
    Reason for failure
    Downstream data rate
    Upstream data rate
    Qualify Loop
    Quantify Loop
// end Analyze Asymmetric DSL
```

When analyzing asymmetric DSL, test inputs are similar as before, and the outputs include a reason for failure after a pass/fail status, a downstream data rate, and upstream data rate. The loop is qualified with one routine, and then quantified with another routine, as defined in the next two sections of pseudo-code, which explain the qualification and quantification of the loop in accordance with the present invention.

```
6.  Pseudo-code to Qualify Loop
Inputs:
    Test Results from WTP, RTU and Plant data,
    Threshold data (technology dependent),
    Technology ID
Outputs:
    Pass/Fail status
    Reason of failure
    if Load coil information available
        if Load coil present
            set Pass/Fail status = FAIL;
            Set Reason of failure status, Load Coil Present = TRUE;
        else
            LcoilPresent Status = FALSE;
    else
        set status Load Coil Information Not Available =
NOT_AVAIALBALE;
    if Impulse Noise test results available
        if Impulse Noise Count less than threshold count
            set status ImpulseCountHigh = PASS
        else
            set status PassFail = FAIL
            set status ImpulseCountHigh = FAIL
    else
        set status WimpulseTestNotAvailable = NOT_AVAILABLE
    if Number of Ringers less than threshold
        set Reason of failure status RingerFault = PASS
    else
        set status PassFail = FAIL
        set Reason of failure status RingerFault = FAIL
// end Qualify Loop
```

When qualifying the loop, various test results from the WTP, RTU and plant data are input, together with the threshold data and technology ID. The outputs include a pass/fail status and the reason for the failure. For example, load coil information, impulse noise test, and the number of ringers is determined. In the quanitification of the loop, signal data is also an input with the data rates as an output. The loop is modeled and can be identical for both directions. The Power Spectral Density (PSD) of transmit data is established for downstream transfers, and a signal-to-noise ratio array is set up for downstream transfers. The downstream data rate is calculated and the Power Spectral Density of transmit data is established for upstream transfers. The signal-to-noise ratio array is established. The upstream data rate is then calculated.

```
7.  Pseudo-code to Quantify Loop
Inputs:
    Test Results from WTP, RTU and Plant data,
    Threshold data (technology dependent),
```

-continued
```
    Signal Data (technology dependent),
    Technology ID
Outputs:
    Pass/Fail status
    Reason of failure
    Downstream data rate
    Upstream data rate
    Model Loop (note: currently identical for both directions)
    setup power spectral density of transmit data for downstream transfers
    setup downstream signal-to-noise-ratio array
    calculate downstream data rate
    setup power spectral density of transmit data for upstream transfers
    setup upstream signal-to-noise-ratio array
    calculate upstream data rate
// end Quantify Loop
```

For the signal-to-noise ratio, the loop is modeled to determine loop attenuation at the receiving end. A signal-to-noise ratio is calculated using the well known Shannon Theorem to calculate the downstream data rate.

Shannon's Theorem gives an upper bound to the capacity of a link, in bits per second (bps), as a function of the available bandwidth and the signal-to-noise ratio of the link. The theorem can be stated as:

$$C = B * \log 2\ (1 + S/N)$$

where C is the achievable channel capacity, B is the bandwidth of the line, S is the average signal power, and N is the average noise power. The signal-to-noise ratio (S/N) is usually expressed in decibels (dB) given by the formula:

$$10 * \log 10\ (S/N).$$

Thus, a signal-to-noise ratio of 1,000 could commonly be expressed as:

$$10 * \log 10\ (1000) = 30\ dB.$$

The pseudo-codes to model the loop and to calculate the loop's ABCD matrices are set forth below. The loop is modeled using inputs as the number of channels, the start frequency, the delta frequency, test results, and technology ID with an output as loop data. Source and load impedances are used, together with the wire gauge information, if available. When calculating the loop's ABCD matrices, the inputs include the number of channels, the start frequency, delta frequency, length of the segment, wire gauge, bridged tap flag, and loop data. The RLCG constants are also modeled (Resistance, Inductance, Capacitance and Conductance), together with the model line parameters. Following the pseudo-code for calculating the loop's ABCD matrices, the pseudo-codes to model the primary constants RLCG, the insertion loss, the line parameters, the signal-to-noise ratio, and the data rate are set forth.

```
8.  Pseudo-code to Model Loop
    Inputs:
        Number of Channels,
        Start Frequency,
        Delta Frequency,
        Test Results,
        Technology ID,
    Outputs:
        Loop Data
        set source and load impedances
        If Wire Gauge Information available
            Set Wire Gauge
        Else
            Set Wire Gauge to default wire gauge
        If Bridged Tap Information is not available
            Set number of taps to zero
        Else
            Calculate Loop's ABCD matrices
        Calculate Insertion Loss of the loop
// end Model Loop
```

```
9.  Pseudo-code to Calculate Loop's ABCD Matrices
    Inputs:
        Number of Channels
        Start Frequency
        Delta Frequency
        Length of the segment
        Wire Gauge
        Bridged Tap Flag
        Loop Data
    Output:
        Loop Data
        initialize loop [ABCD] to unity
        do for all segments of the loop
            Do for the frequency range
                Model the RLCG Constants
                Model Line Parameters
                If it is Bridged Tap section
                    A = 1
                    B = 0
                    C = Ctanh (Gamma)
                    D = Ctanh(Gamma)/Z0;
                else
                    A = D = Ccosh (Gamma)
                    B = Csinh(Gamma) * Z0;
                    C = Csinh(Gamma) /Z0;
    Multiply by the accumulated [ABCD] from previous segments
            // end do for the frequency range
        end do for all segments of the loop
// end Calculate loop's ABCD matrices
```

```
10. Pseudo-code to Model the Primary Constants RLCG
    Inputs:
        Frequency in kHz
        Wire Gauge
    Outputs:
        Primary Constants, RLCG
        if Wire Gauge Information Available
            set cable model parameters based on the wire gauge
        else
            set cable model parameters using average of
    AWG_24 and AWG_26
        Calculate Primary Constants, RLCG
```

```
11. Pseudo-code to Calculate Insertion Loss
    Do for all channels
        set load impedance (Z_load) for the current technology
        set source impedance (Z_source) for the current technology
        Insertion Loss = 20 * log (abs ((A * Z_load + B + Z_source *
            (C * Z_load +D))/Z_source + Z_load)))
// end of for all channels} // end of Calculate
Insertion Loss
```

```
12. Pseudo-code to Calculate Line Parameters
    Inputs:
        Frequency
        Primary Constants (RLCG)
```

-continued

```
        Outputs:
            Line Parameters
            Z = R + j*2*PI*f*L;
            Y = G + j 2PI*Frequency*C;
            Gamma = Csqrt(Z*Y);
            Z0 = CSqrt(Z/Y);
        // end Calculate Line Paramters
```

```
13. Pseudo-code to Setup Signal to Noise Ratio
Inputs:
    Number of channels
    Start Frequency
    Delta Frequency
    PSD data
    Wmargin data
    Loop data
    Downstream flag
Outputs:
    Signal to noise ratio for all channels
Do for all channels
    convert transmit signal PSD from dBm/Hz to dB
    calculate signal level at receiver end
    convert noise to dB
    signal to noise [dB] = signal [dB] − noise [dB]
// end for all channels
// end Setup Signal to Noise Ratio
```

```
14. Pseudo-code to Calculate Data Rate
Inputs:
    Bat Results
    Number of Channels
    Start Frequency
    Delta Frequency
    Signal to noise data
    Technology ID
    Downstream flag
Outputs:
    Downstream/upstream data rate
    Switch (Technology ID)
        case BAT_ADSL:
            if (Downstream)
                for channels 33 through 255 (excluding channel 64)
                    signal_to_noise [dB] =
signal_to_noise − snr_margin − snr_gap
                    if (signal_to_nois > 0)
                        Delta Capacity = log2(1 +
pow(10.0,0.1*signal_to_noise [dB]))
                            If (Delta Capacity > MAX_BIT)
                                Delta Capacity = MAX_BIT
                            If (Delta Capacity < MIN_BIT)
                                Delta Capacity = MIN_BIT
                    Downstream Data Rate = Downstream Data Rate +
Delta Capapcity * data_frame_rate
            else
                for channels 6 through 31 (excluding channel 16)
                    signal_to_noise [dB] =
signal_to_noise − snr_margin − snr_gap
                    if (signal_to_noise > 0)
                        Delta Capacity = log2(1 +
pow(10.0,0.1*signal_to_noise [dB]))
                            If (Delta Capacity > MAX_BIT)
                                Delta Capacity = MAX_BIT
                            If (Delta Capacity < MIN_BIT)
                                Delta Capacity = MIN_BIT
                    Upstream Data Rate = Upstream Data Rate +
Delta Capapcity * data_frame_rate
            break;
        case HDSL2:
            Not implemented yet
            break;
```

-continued

```
        case BAT_VDSL:
            break;
        default:
            for all channels
                signal_to_noise ratio =
signal_to_noise ratio − snr_margin − snr_gap
                if (signal_to_noise ratio > 0)
                    Delta Capacity = log2(1 + pow(10,
0.1 * signal_to_noise ratio))
                        Total Capacity = Total Capacity +
Delta Capacity * data_frame_rate
// Calculate data rate
```

It is evident that the present invention is operable to take the raw data from various test units, and more particularly, the Wideband Test Pack, Remote Test Units, and plant record data to qualify and quantify a local loop under test for a particular DSL technology. Also, the WTP, RTU, and plant record data can be analyzed to recommend the best technology for a given application in an efficient manner.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

What is claimed is:

1. A method of analyzing a telephone local loop comprising the steps of:
    testing the telephone local loop and determining the physical loop faults within the local loop;
    qualifying the local loop for a particular Digital Subscriber Line (DSL) technology by comparing the results of local loop testing to thresholds specified by given DSL technologies, wherein the step of qualifying the local loop comprises the step of testing for the presence or absence of load coils, impulse noise counts, and ringer counts, and then comparing the counts with thresholds specified by given DSL technologies; and
    quantifying the local loop by modeling the local loop and calculating the signal-to-noise ratio and calculating the data rates of the local loop for the particular DSL technology.

2. A method according to claim 1, wherein the particular DSL technology comprises symmetric DSL technology.

3. A method according to claim 1, wherein the particular DSL technology comprises asymmetric DSL technology.

4. A method according to claim 1, wherein the step of modeling the local loop comprises the step of modeling the Resistance, Inductance, Capacitance, and Conductance (RLCG) primary constants and the line parameters for various segments of the local loop.

5. A method according to claim 4, wherein the line parameters are modeled based on the frequency and RLCG primary constants.

6. A method according to claim 1, wherein the step of determining physical loop faults includes the step of obtaining plant data and test results from a test head within a communications network containing the local loop.

7. A method according to claim 1, wherein the step of quantifying the local loop comprises the step selecting a particular DSL technology from a configurable list of DSL technologies and analyzing each technology within the list until local loop qualifies.

8. A method of analyzing a telephone local loop comprising the steps of:
- testing the telephone local loop and determining the physical loop faults within the local loop;
- qualifying the local loop for a particular Digital Subscriber Line (DSL) technology by comparing the results of local loop testing to thresholds specified by given DSL technologies, wherein the step of qualifying the local loop comprises the step of testing for the presence or absence of load coils, impulse noise counts, and ringer counts, and then comparing the counts with thresholds specified by given DSL technologies; and
- quantifying the local loop by modeling the local loop and calculating the transmit signal Power Spectral Densities (PSD), and calculating upstream and downstream data rates for the particular DSL technology.

9. A method according to claim 8, wherein the particular DSL technology comprises asymmetric DSL technology.

10. A method according to claim 8, and comprising the step of modeling the local loop by modeling the Resistance, Inductance, Capacitance, and Conductance (RLCG) primary constants and the line parameters for various segments of the local loop.

11. A method according to claim 10, wherein the line parameters are modeled based on the frequency and RLCG primary constants.

12. A method according to claim 8, wherein the step of determining physical loop faults includes the step of obtaining test results from a test head within a communications network containing the local loop and plant data.

13. A method according to claim 8, wherein the step of quantifying the local loop comprises the step of calculating downstream and upstream data rates based on the downstream and upstream transmit signal Power Spectral Densities (PSD), insertion loss, and noise versus frequency measurements.

14. A method according to claim 13, and further comprising the step of calculating the insertion loss of the local loop with or without bridged taps based on the cable type, wire gauge, loop length and its topology.

15. A method according to claim 8, wherein the step of quantifying the local loop comprises the step selecting a particular DSL technology from a configurable list of DSL technologies and analyzing each technology within the list until local loop qualifies.

16. A system for analyzing a telephone local loop comprising:
- a central office operatively connected to a telephone local loop; and
- a bandwidth analysis system operatively connected to the central office and including a remote test unit for obtaining local loop line data, said bandwidth analysis system operative for:
- (a) determining the physical loop faults within the local loop;
- (b) qualifying the local loop for a particular Digital Subscriber Line (DSL) technology; and
- (c) quantifying the local loop by modeling the local loop and calculating the signal-to-noise ratio and calculating data rates for the particular DSL technology.

17. A system according to claim 16, and further comprising a call center operatively connected to the central office, said call center having a test access controller and said bandwidth analysis system comprising a software module associated with said test access controller.

18. A system according to claim 16, wherein the bandwidth analysis system is operative for modeling the Resistance, Inductance, Capacitance, and Conductance (RLCG) primary constants and the line parameters for various segments of the local loop.

19. A system according to claim 18, wherein the line parameters are modeled based on the frequency and RLCG primary constants.

20. A system according to claim 16, wherein the bandwidth analysis system is operative for determining physical loop faults by obtaining plant data and test results from a test head within a communications network containing the local loop.

21. A system according to claim 16, wherein the bandwidth analysis system is operative for qualifying the local loop by testing for the presence or absence of load coils, impulse noise counts, and ringer counts, and then comparing the counts with thresholds specified by given DSL technologies.

22. A system according to claim 16, wherein the bandwidth analysis system is operative for quantifying the local loop by calculating downstream and upstream data rates based on the downstream and upstream transmit signal power spectral densities (PSD), insertion loss, and noise versus frequency measurements.

23. A system according to claim 22, wherein the bandwidth analysis system is operative for calculating the insertion loss of the local loop with or without bridged taps based on the cable type, wire gauge, loop length and its topology.

24. A system according to claim 16, wherein the bandwidth analysis system is operative for selecting a particular DSL technology from a configurable list of DSL technologies and analyzing each technology within the list until local loop qualifies.

25. A system for analyzing a telephone local loop comprising:
- a central office operatively connected to a telephone local loop; and
- a bandwidth analysis system operatively connected to the central office and including a remote test unit for obtaining local loop line data, said bandwidth analysis system operative for:
- (a) determining the physical loop faults within the local loop;
- (b) qualifying the local loop for a particular Digital Subscriber Line (DSL) technology; and
- (c) quantifying the local loop by modeling the local loop and calculating the transmit signal Power Spectral Densities (PSD), and calculating upstream and downstream data rates for the particular DSL technology.

26. A system according to claim 25, and further comprising a call center operatively connected to the central office, said call center having a test access controller and bandwidth analysis system.

27. A system according to claim 25, wherein the bandwidth analysis system is operative for modeling the Resistance, Inductance, Capacitance, and Conductance (RLCG) primary constants and the line parameters for various segments of the local loop.

28. A system according to claim 27, wherein the line parameters are modeled based on the frequency and RLCG primary constants.

29. A system according to claim 25, wherein the bandwidth analysis system is operative for determining physical loop faults by obtaining plant data and test results from a test head within a communications network containing the local loop.

30. A system according to claim 25, wherein the bandwidth analysis system is operative for qualifying the local loop by testing for the presence or absence of load coils, impulse noise counts, and ringer counts, and then comparing the counts with thresholds specified by given DSL technologies.

31. A system according to claim 25, wherein the bandwidth analysis system is operative for quantifying the local loop by calculating downstream and upstream data rates based on the downstream and upstream transmit signal power spectral densities (PSD), insertion loss, and noise versus frequency measurements.

32. A system according to claim 25, wherein the bandwidth analysis system is operative for calculating the insertion loss of the local loop with or without bridged taps based on the cable type, wire gauge, loop length and loop topology.

33. A system according to claim 25, wherein the bandwidth analysis system is operative for selecting a particular DSL technology from a configurable list of DSL technologies and analyzing each technology within the list until a local loop qualifies.

34. A method of analyzing a telephone local loop comprising the steps of:
   determining the physical loop faults within the local loop;
   qualifying the local loop for a particular Digital Subscriber Line (DSL) technology by testing for the presence or absence of load coils, impulse noise counts, and ringer counts, and comparing the counts with thresholds specified by given DSL technologies; and
   quantifying the local loop by calculating the signal-to-noise ratio and calculating the data rates of the local loop for the particular DSL technology.

35. A method of analyzing a telephone local loop comprising the steps of:
   determining the physical loop faults within the local loop;
   qualifying the local loop for a particular Digital Subscriber Line (DSL) technology; and
   quantifying the local loop by calculating the signal-to-noise ratio and calculating the data rates of the local loop for the particular DSL technology by calculating downstream and upstream data rates based on the downstream and upstream transmit signal Power Spectral Densities (PSD), insertion loss, and noise versus frequency measurements.

36. A method of analyzing a telephone local loop comprising the steps of:
   testing the telephone local loop and determining the physical loop faults within the local loop;
   qualifying the local loop for a particular Digital Subscriber Line (DSL) technology by comparing the results of local loop testing to thresholds specified by given DSL technologies; and
   quantifying the local loop by modeling the local loop and calculating the signal-to-noise ratio and calculating the data rates of the local loop for the particular DSL technology by calculating downstream and upstream data rates based on the downstream and upstream transmit signal Power Spectral Densities (PSD), insertion loss, and noise versus frequency measurements.

37. A method according to claim 36, and further comprising the step of calculating the insertion loss of the local loop with or without bridged taps based on the cable type, wire gauge, loop length and loop topology.

* * * * *